United States Patent
Sappey et al.

(10) Patent No.: US 12,321,015 B2
(45) Date of Patent: Jun. 3, 2025

(54) DEMULTIPLEXING FILTER AND METHOD

(71) Applicant: MG SMART VENTURES, LLC, Dover, DE (US)

(72) Inventors: Andrew D. Sappey, Lakewood, CO (US); Bernard P. Masterson, Louisville, CO (US); Pei Huang, Lafayette, CO (US)

(73) Assignee: MG SMART VENTURES, LLC, Dover, DE (US)

( * ) Notice: Subject to any disclaimer, the term of this patent is extended or adjusted under 35 U.S.C. 154(b) by 325 days.

(21) Appl. No.: 18/014,480

(22) PCT Filed: Jun. 25, 2021

(86) PCT No.: PCT/IB2021/055711
§ 371 (c)(1),
(2) Date: Jan. 5, 2023

(87) PCT Pub. No.: WO2022/013657
PCT Pub. Date: Jan. 20, 2022

(65) Prior Publication Data
US 2023/0258870 A1    Aug. 17, 2023

Related U.S. Application Data

(60) Provisional application No. 63/053,086, filed on Jul. 17, 2020.

(51) Int. Cl.
*G02B 6/293*   (2006.01)
*G01N 21/25*   (2006.01)
(Continued)

(52) U.S. Cl.
CPC ......... *G02B 6/2931* (2013.01); *G01N 21/255* (2013.01); *G01N 21/3504* (2013.01);
(Continued)

(58) Field of Classification Search
CPC .. G02B 6/2931; G02B 6/2938; G01N 21/255; G01N 21/3504; G01N 2021/3129; G01N 2201/0833
See application file for complete search history.

(56) References Cited

U.S. PATENT DOCUMENTS 6,829,096 B1   12/2004  Wade
2003/0026541 A1   2/2003  Sappey et al.
(Continued)

OTHER PUBLICATIONS

McMahon D. H. et. al., "Echelon grating multiplexers for hierarchically multiplexed fibres-optic communication networks", Applied Optics, vol. 26, Issue 11, Jun. 1, 1987, pp. 2188-2196.

*Primary Examiner* — Michelle M Iacoletti
*Assistant Examiner* — Maher Yazback
(74) *Attorney, Agent, or Firm* — Perilla Knox & Hildebrandt LLP; Jonathan A. Paulis; Kenneth A. Knox

(57) ABSTRACT

A demultiplexed filtering method includes propagating an optical beam from an input optical fiber to a diffraction grating to produce a first and a second diffracted beam having a respective first center wavelength $\lambda_1$ and a second center-wavelength $\lambda_2 > \lambda_1$ of the optical beam. The first diffracted beam propagates back toward the input optical fiber at a first diffracted angle determined in part by $\lambda_1$ and a diffraction order m1 of the first diffracted beam. The second diffracted beam propagates back toward the input optical fiber at a second diffracted angle determined in part by $\lambda_2$ and a diffraction order $m_2 < m_1$. The method also includes (i) coupling the first diffracted beam into a first optical fiber of a one-dimensional optical-fiber array that includes the input optical fiber, and (ii) coupling the second diffracted beam into a second optical fiber of the one-dimensional optical-fiber array.

24 Claims, 6 Drawing Sheets

(51) Int. Cl.
*G01N 21/3504* (2014.01)
*G01N 21/31* (2006.01)

(52) U.S. Cl.
CPC ... *G02B 6/2938* (2013.01); *G01N 2021/3129* (2013.01); *G01N 2201/0833* (2013.01)

(56) References Cited

U.S. PATENT DOCUMENTS

| | | | |
|---|---|---|---|
| 2004/0052449 A1* | 3/2004 | Trutna, Jr. | G02B 6/29361 385/24 |
| 2008/0074645 A1 | 3/2008 | Sappey et al. | |
| 2017/0195755 A1* | 7/2017 | Schindler | H04J 14/06 |
| 2019/0041578 A1* | 2/2019 | Mahgerefteh | G02B 6/12016 |
| 2023/0314312 A1* | 10/2023 | Huelson | G01N 21/3504 250/338.5 |

\* cited by examiner

| surface | radius, mm | thickness, mm | glass | diameter, mm | conic |
|---|---|---|---|---|---|
| OBJ | Infinity | 0.00 | | 1.35 | 0 |
| 501 | Infinity | 1.20 | | 1.35 | 0 |
| 502 | -11.02362 | 10.00 | S-NPH1_ZMM | 8.00 | 0 |
| 503 | 18.899 | 0.01 | | 18.00 | 0 |
| 504 | 18.899 | 7.50 | S-BAL41 | 17.60 | 0 |
| 505 | -13.41401 | 36.94 | SF4_ZMM | 17.60 | 0 |
| 506 | -123.2377 | 10.00 | S-NPH1_ZMM | 23.00 | 0 |
| 507 | 26.449 | 0.01 | | 25.00 | 0 |
| 508 | 26.449 | 6.80 | S-BAL41 | 24.60 | 0 |
| 509 | -37.17418 | 10.00 | SF4_ZMM | 24.60 | 0 |
| 510 | Infinity | 20.00 | | 16.08 | 0 |
| 532 | Infinity | | | 22.09 | 0 |

DEMULTIPLEXING FILTER AND METHOD

RELATED APPLICATIONS

This application is a national phase of PCT/IB2021/055711, filed Jun. 25, 2021 which claims the benefit of and priority to U.S. Provisional Patent Application No. 63/053,086, filed Jul. 17, 2020, which are incorporated herein by reference in their entireties.

BACKGROUND

Maintaining efficient operation of combustion devices such as furnaces and boilers requires accurate measurement of gaseous species concentration and temperature in a combustion zone of the combustion device. Laser spectroscopy is one measurement method, where an optical beam from a laser is sensed after transmission through the combustion zone. High background light levels are often present in such measurements due to the presence of luminous flames (e.g., coal-fired boilers) or bright emission from arcs or discharges (e.g. electric arc furnaces). The light emission from these background sources is broadband, typically encompassing up to and beyond a one-micrometer bandwidth. After transiting these environments, the optical beam, which may be narrowband, is often attenuated by factors of up to 70 dB or more depending on the beam's path length through the combustion zone. After attenuation, the broadband background light can exceed the power from the probe signal, making measurements very challenging or impossible.

SUMMARY OF THE EMBODIMENTS

Embodiments disclosed herein solve this problem by filtering broadband background light while allowing detection of the probe signal with minimum attenuation.

In a first aspect, a demultiplexed filtering method includes propagating an optical beam from an input optical fiber to a diffraction grating to produce a first diffracted beam and a second diffracted beam. A center-wavelength of the first diffracted beam equals a first center-wavelength of a first channel of the optical beam. A center-wavelength of the second diffracted beam equals a second center-wavelength of a second channel of the optical beam. The second center-wavelength exceeds the first center-wavelength. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$. The method also includes (i) coupling the first diffracted beam into a first optical fiber of a one-dimensional optical-fiber array that includes the input optical fiber, and (ii) coupling the second diffracted beam into a second optical fiber of the one-dimensional optical-fiber array.

In a second aspect, a method for measuring species concentration in a combustion zone includes propagating a multiplexed input probe beam through the combustion zone to produce an output probe beam and coupling the output probe beam into an input optical fiber. The combustion zone includes (i) a first gas-phase species that has an absorption line at a first center-wavelength and (ii) a second gas-phase species that has an absorption line at a second center-wavelength that exceeds the first center-wavelength. The method also includes propagating the output probe beam from the input optical fiber to a diffraction grating to produce a first diffracted beam, and a second diffracted beam. A center-wavelength of the first diffracted beam equals the first center-wavelength. A center-wavelength of the second diffracted beam equals the second center-wavelength. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$. The method also includes (i) coupling the first diffracted beam into a first optical fiber of a one-dimensional optical-fiber array that includes the input optical fiber, and (ii) coupling the second diffracted beam into a second optical fiber of the one-dimensional optical-fiber array. The method also includes measuring (i) a first signal amplitude of the first diffracted beam output from the first optical fiber and (ii) a second signal amplitude of the second diffracted beam output from the second optical fiber. The method also includes determining (i) from the first signal amplitude, a concentration of the first gas-phase species and the second gas-phase species.

In a third aspect, a demultiplexing filter includes an optical-fiber array, a diffraction grating, and a lens. The optical-fiber array includes (i) an input optical fiber having a fiber optical axis and an input fiber end-face, a surface thereof defining a fiber end-face plane; (ii) a first output optical fiber having a first fiber end-face that is substantially coplanar to the fiber end-face plane, and a first optical axis that is parallel to and coplanar with the fiber optical axis; and (iii) a second output optical fiber having a second fiber end-face that is coplanar to the fiber end-face plane to within the tolerance, and a second optical axis that is parallel to and coplanar with the fiber optical axis, the input fiber end-face, the first fiber end-face, and the second fiber end-face being collinear. The diffraction grating has a blazed diffractive surface facing the fiber end-face plane and tilted, with respect to the fiber optical axis, by a tilt angle that deviates from a blaze angle of the blazed diffractive surface by between 0.05 and 0.5 degrees. The lens is located along an optical path between the optical-fiber array and the diffraction grating, having a lens optical-axis perpendicular to the fiber end-face plane and configured to form an image of the blazed diffractive surface in a focal plane that is substantially coplanar with the fiber end-face plane.

DETAILED DESCRIPTION OF THE EMBODIMENTS

Figure 1:
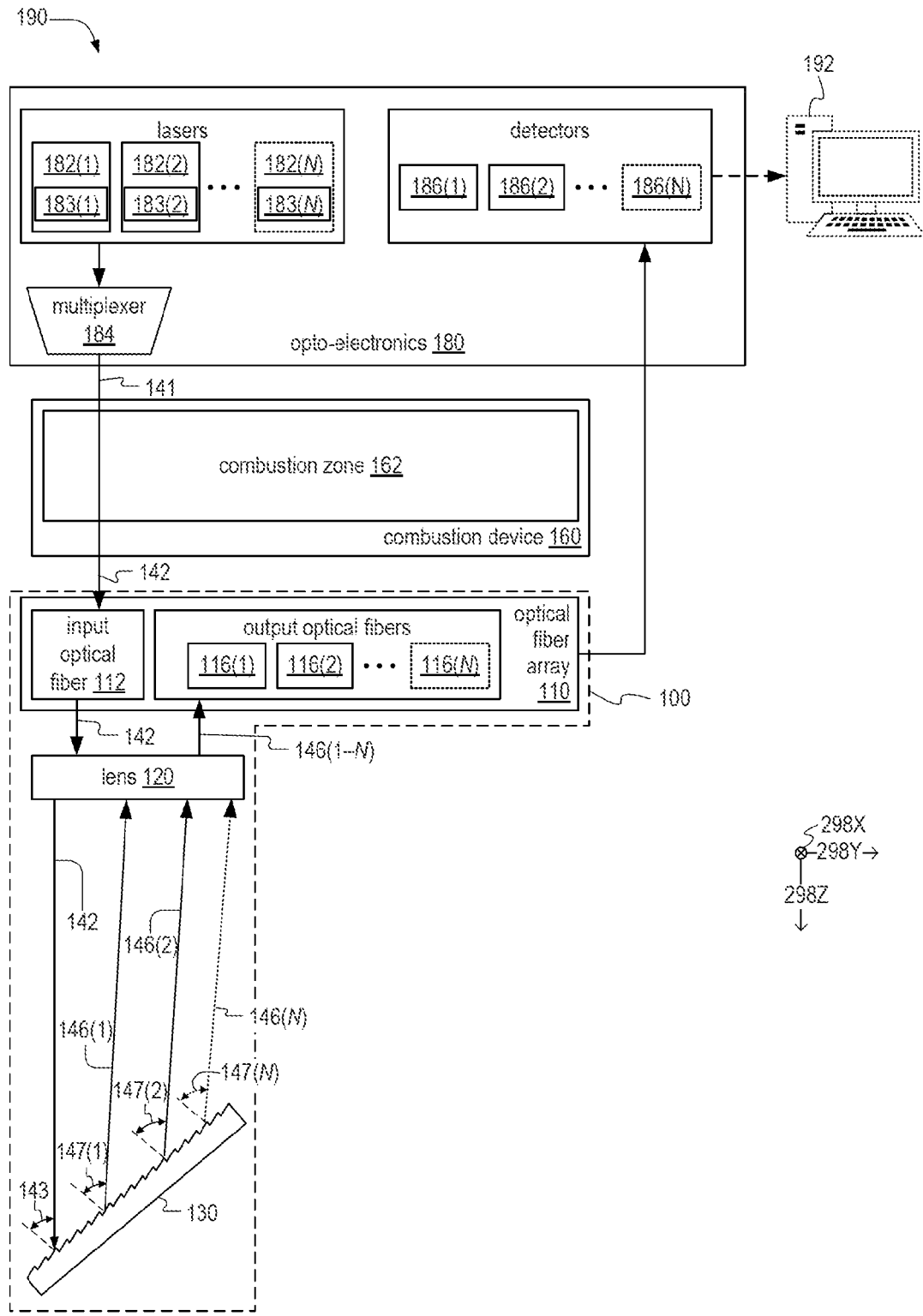
FIG. 1 is a schematic block diagram of a demultiplexing filter operating as part of a monitored combustion system, in an embodiment.

FIG. 1 is a schematic block diagram of a demultiplexing filter 100 in an example and non-limiting use scenario as part of a monitored combustion system 190. Demultiplexing filter 100 may be employed in other applications that require optical demultiplexing, such as telecommunications.

In combustion system 190, demultiplexing filter 100 is configured to measure species concentration in a combustion zone 162 of a combustion device 160. Examples of combustion device 160 include furnaces and boilers. The cross-section illustrated in FIG. 1 is parallel to a plane, hereinafter the y-z plane, formed by orthogonal axes 298Y and 298Z, which are each orthogonal to an axis 298X. Herein, the x-y plane is formed by orthogonal axes 298X and 298Y, and planes parallel to the x-y plane are referred to as transverse planes. Unless otherwise specified, heights of objects herein refer to the object's extent along axis 298Y. Herein, a reference to an axis x, y, or z refers to axes 298X, 298Y, and 298Z respectively. Also, herein, a horizontal plane is parallel to the x-z plane, a width refers to an object's extent along the z axis, and vertical refers to a direction along the y axis.

Monitored combustion system 190 also includes optoelectronics 180, which includes a plurality of lasers 182, a plurality of photodetectors 186, and a multiplexer 184. Lasers 182 include laser 182(1) and 182(2), and may also include additional lasers 182(3-N), where channel count N is an integer greater than equal to two. Photodetectors 186 include photodetectors 186(1) and 186(2), and may also include additional photodetectors 186(3-N). Multiplexer 184 combines the output of lasers 182 to produce a multiplexed probe beam 141. In embodiments, demultiplexing filter 100 includes at least one of lasers 182, multiplexer 184, and photodetectors 186. In embodiments, monitored combustion system 190 includes a computer 192 for processing output of photodetectors 186

Each channel of multiplexed probe beam 141 corresponds to a respective center-wavelength 183($k$) of laser 182($k$), where k is a channel number and is an integer in the range of one to N. Herein, $\lambda_k$ denotes center-wavelength 183($k$). In embodiments, center-wavelengths 183($k$) increase with k, such that center-wavelength 183($k$+1) exceeds center-wavelength 183($k$).

Demultiplexing filter 100 includes an optical-fiber array 110, a lens 120, and a diffraction grating 130. Optical-fiber array 110 includes an input optical fiber 112 and a plurality of output optical fibers 116. Output optical fibers 116 include output optical fibers 116(1) and 116(2), and may also include additional output optical fibers 116(3-N). Input optical fiber 112 receives multiplexed probe beam 141 as an optical beam 142, herein also referred to as an output probe beam. Optical beam 142 propagates from input optical fiber 112 to diffraction grating 130 to produce diffracted beams 146(1) and 146(2) and, in embodiments, additional diffracted beams 146(2-N).

Species present in combustion zone 162 have absorption lines in the near-infrared portion of the electromagnetic spectrum. In embodiments, the spectral density of optical beam 142 differs from that of multiplexed probe beam 141 according to concentrations of said species. Center-wavelength 183 may be between 1.3 micrometers and 2.5 micrometers. In embodiments, at least one center-wavelength 183 corresponds to an absorption line of one of water, carbon monoxide, and carbon dioxide. In one such embodiment, each of center-wavelengths 183 corresponds to an absorption line of one of water, carbon monoxide, and carbon dioxide, the channel count N is at least five.

Multi-mode fibers have wider fiber cores than single-mode fibers, which facilitates the coupling of diffracted beams 146 to output optical fibers 116 with lens 120. In embodiments, each output optical fibers 116 operate as multi-mode fiber in a wavelength range between 1.3 micrometers and 2.5 micrometers. At any wavelength in this range, input optical fiber 112 may operate as single-mode fiber or a multi-mode optical fiber. In embodiments, each output optical fiber 116 may have a fiber-core diameter greater than ninety micrometers, and input optical fiber 112 may have a fiber-core diameter between 50 micrometers and 200 micrometers for facilitating optical coupling thereto.

In embodiments, input optical fiber 112 has a core radius core radius $a_0$ to and a numerical aperture $NA_0$ such that its V parameter $2\pi(a_0/\max(\lambda_k))NA_0$ is greater than or equal to 2.405 to ensure multi-mode operation at each center-wavelength $\lambda_k$. In embodiments, each output optical fiber 116($k$) has a core radius core radius $a_k$ and a numerical aperture $NA_k$ such that its V parameter $2\pi(a_k/\lambda_k)NA_0$ is greater than or equal to 2.405 to ensure multi-mode operation at center-wavelength $\lambda_k$.

Figure 2:
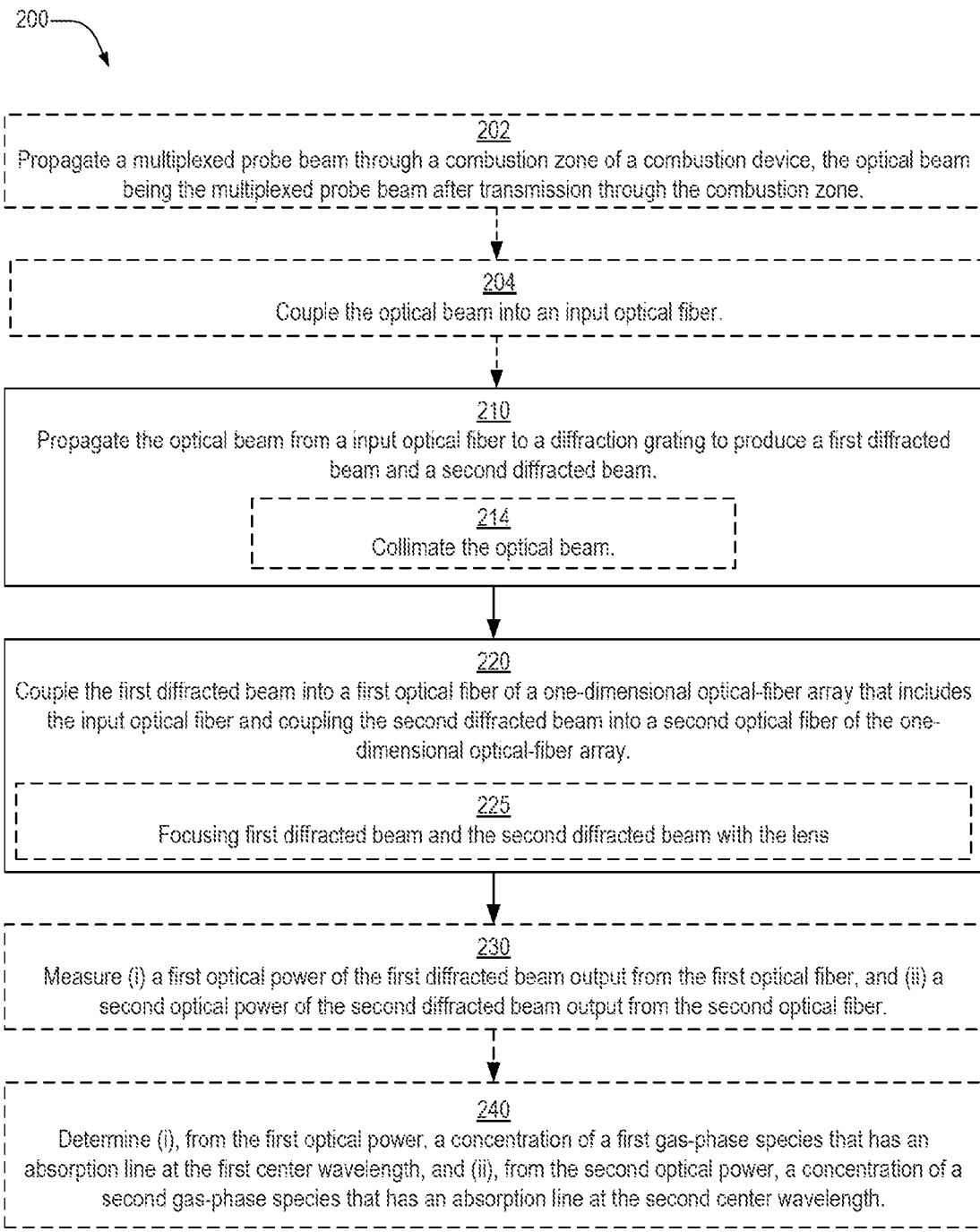
FIG. 2 is a flowchart illustrating a demultiplexed filtering method implementable by the demultiplexing filter of FIG. 1, in an embodiment.

FIG. 2 is a flowchart illustrating a demultiplexed filtering method 200. In embodiments, method 200 is implemented by demultiplexing filter 100 as part of monitored combustion system 190. Method 200 includes steps 210 and 220. In embodiments, method 200 also includes at least one of steps 230 and 240.

Step 210 includes propagating an optical beam from an input optical fiber to a diffraction grating to produce a first diffracted beam and the second diffracted beam. A center-wavelength of the first diffracted beam equals a first center-wavelength of a first channel of the optical beam. A center-wavelength of the second diffracted beam equals a second center-wavelength of a second channel of the optical beam. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$.

In an example of step 210, optical beam 142 propagates from input optical fiber 112 to diffraction grating 130 to produce diffracted beams 146(1) and 146(2), which have respective center-wavelengths 183(1) and 183(2). Diffracted beams 146(1) and 146(2) propagate back toward the input optical fiber 112 at respective diffracted angles 147(1) and 147(2). Angle 147(1) is determined in part by center-wavelength 183(1) and a diffraction order of diffracted beam 146(1). Angle 147(2) is determined in part by center-wavelength 183(2) and a diffraction order of diffracted beam 146(2). Each angle 147 is in a plane parallel to the y-z plane.

In embodiments, step 210 produces additional diffracted beams with respective center wavelengths and diffraction orders. For example, step 210 produces diffracted beams 146(3-N) with respective center-wavelengths 183(3-N) and diffraction orders $m_{3-N}$, where $m_{k+1}$ is less than $m_k$.

In embodiments, step 210 includes step 214. Step 214 includes collimating the optical beam with a lens located between a tip of the input optical fiber and the diffraction grating. In an example of step 214, lens 120 collimates optical beam 142 as optical beam 142 propagates from input optical fiber 112 and diffraction grating 130.

Step 220 includes coupling the first diffracted beam into a first optical fiber of a one-dimensional optical-fiber array that includes the input optical fiber and coupling the second diffracted beam into a second optical fiber of the one-dimensional optical-fiber array. In an example of step 220, each diffracted beam 146(k) is coupled into a respective output optical fiber 116(k).

In embodiments, each step 220 includes step 225, which includes focusing, with a lens, the first diffracted beam and the second diffracted beam onto respective tips of first output optical fiber and the second output optical fiber. In an example of step 225, lens 120 focuses each diffracted beam 146(k) onto a respective tip of output optical fiber 116(k).

Step 230 includes measuring (i) a first signal amplitude of the first diffracted beam output from the first optical fiber, and (ii) a second signal amplitude of the second diffracted beam output from the second optical fiber. In an example of step 230, each photodetector 186(k) measures a respective signal amplitude of diffracted beam 146(k).

Step 240 includes determining (i), from the first signal amplitude, a concentration of a first gas-phase species that has an absorption line at the first center wavelength, and (ii), from the second signal amplitude, a concentration of a second gas-phase species that has an absorption line at the second center wavelength. In an example of step 240, for each channel number k, computer 192 determines, from each signal amplitude of diffracted beam 146(k), a concentration of a respective gas-phase species that has an absorption line at center-wavelength 183(k).

In embodiments, method 200 is part of a method for measuring species concentration in a combustion zone. In such embodiments, method 200 includes steps 202 and 204. Step 202 includes propagating a multiplexed probe beam through the combustion zone, where the optical beam of step 210 is the multiplexed probe beam after transmission through the combustion zone. In an example of step 202, multiplexed probe beam 141 propagates through combustion zone 162, where optical beam 142 is multiplexed probe beam 141 after having propagated through combustion zone 162. Step 204 includes coupling the optical beam into the input optical fiber. In an example of step 204, optical beam 142 is coupled into input optical fiber 112, e.g., by a lens.

Figure 3:
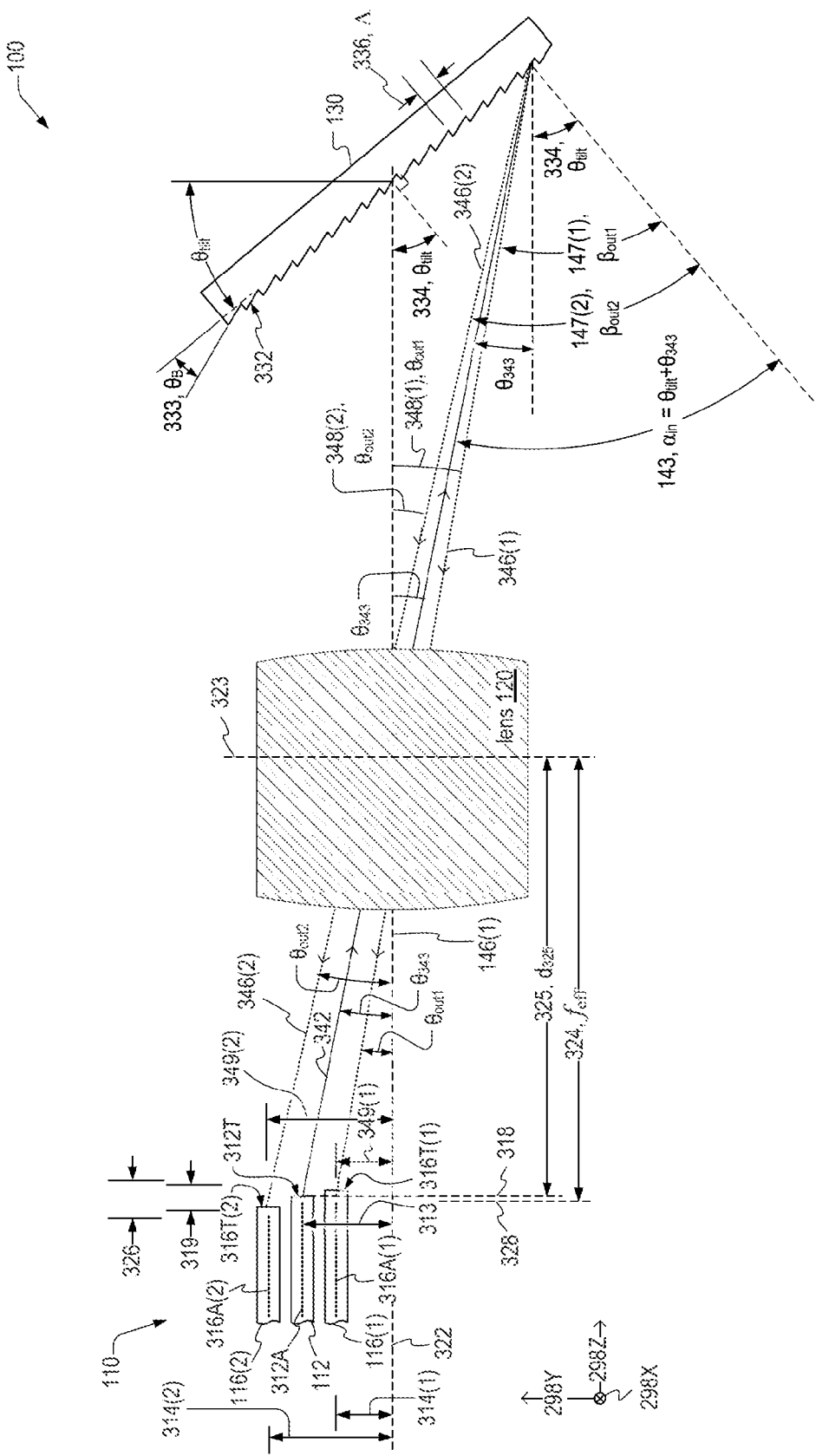
FIG. 3 is a schematic cross-sectional view of the demultiplexing filter of FIG. 1 shown in greater detail than in FIG. 1, in an embodiment.

FIG. 3 is a schematic cross-sectional view of demultiplexing filter 100 shown in greater detail than is shown in FIG. 1. Input optical fiber 112 has a fiber axis 312A and an input fiber end-face 312T. A surface of input fiber end-face 312T defines a fiber end-face plane 318. In embodiments, fiber axis 312A defines the direction of axis 298Z and fiber end-face plane 318 defines the orientation of x-z plane.

Output optical fiber 116(1) has a fiber end-face 316T(1) that is substantially coplanar with fiber end-face plane 318, and a fiber axis 316A(1) that is parallel to and coplanar with fiber axis 312A in the x-z plane. Output optical fiber 116(2) has a fiber end-face 316T(2) that substantially coplanar with fiber end-face plane 318, and a fiber axis 316A(2) that is parallel to and coplanar with fiber axis 312A. Fiber end-faces 312T, 316T(1), 316T(2) are substantially collinear along a line parallel to the y axis in fiber end-face plane 318. In embodiments, fiber end-faces 312T, 316T(1), 316T(2) are substantially collinear when a line in fiber end-face plane 318 intersects each respective cores of output optical fibers 112, 116(1), and 116(2). More generally, tips of optical fibers 112 and 116(1-N) are substantially collinear in fiber end-face plane 318 when a line in fiber end-face plane 318 intersects each respective cores of optical fibers 112 and 116(1-N).

Diffraction grating 130 has a blazed diffractive surface 332 that faces fiber end-face plane 318 and is tilted with respect to fiber axis 312A by a tilt angle 334, herein also ° tilt. Blazed diffractive surface 332 is characterized by a blaze angle 333, hereinafter also OB and a grating period 336, hereinafter also A. Tilt angle 334 deviates from blaze angle 333 by between 0.05 and 0.5 degrees such that diffraction grating 130 is in a near-Littrow configuration with respect to input optical fiber 312. In embodiments, diffraction grating 130 deviates from a true Littrow configuration such that optical beams emitted from input optical fiber 312 and reflected by diffraction grating 130 are coupled into one of output fibers 316, rather than to input optical fiber 312.

Lens 120 is along an optical path between optical-fiber array 110 and diffraction grating 130. Lens 120 has an optical axis 322 that is at least one of perpendicular to fiber end-face plane 318 and parallel to fiber optical axis 318A. Lens 120 is configured to form an image of the blazed diffractive surface 332 in a focal plane 328 that is substantially coplanar with fiber end-face plane 318.

In order of distance from optical axis 322, FIG. 3 illustrates output optical fiber 116(2) closest to optical axis 322, followed by input optical fiber 112 and output optical fiber 116(1). Without departing from the scope of the embodiments, relative distances of output optical fibers 116 and input optical fiber 112 with respect to optical axis 322 may differ from that illustrated in FIG. 3.

In embodiments, focal plane 328 being substantially coplanar with fiber end-face plane 318 means that focal plane 328 is coplanar with fiber end-face plane 318 to within a depth of focus 326 of lens 120. In embodiments, depth of focus 326 equals twice a Rayleigh range of a focused spot formed by lens 120 from a collimated beam incident thereon. In embodiments, fiber end-faces 316T being substantially coplanar with fiber end-face plane 318 means that fiber end-faces 316T are coplanar with fiber end-face plane 318 to within a tolerance 319. Tolerance 319 is a distance in a direction parallel to fiber axis 312A. In embodiments, tolerance 319 is less than or equal to depth of focus 326.

Lens 120 has a principal plane 323 and an effective focal length 324. Principal plane 323 is located at a distance 325 from fiber end-face plane 318 in the z direction, hereinafter also $d_{325}$. In embodiments, distance 325 equals effective focal length 324. In embodiments, distance 325 and effective focal length 324 are substantially equal, such that a difference between distance 325 and effective focal length 324 is less than depth of focus 326. In embodiments, lens 120 is a compound lens, such that it includes at least two single lenses. In such embodiments, principal plane 323 may be located between any two of the single lenses of lens 120.

The following describes the operation of demultiplexing filter 100 in an example use scenario. FIGS. 1 and 3 are best viewed together in the following description.

Input optical fiber 312 emits an optical beam 142, which includes a first optical channel having center-wavelength 183(1) and a second optical channel having center-wavelength 183(2) that exceeds center-wavelength 183(1). For clarity of illustration, FIG. 3 represents optical beam 142 as a chief-ray 342 of optical beam 142. Chief-ray 342 propagates at a chief-ray angle 343, hereinafter also $\theta_{343}$ with respect to optical axis 322. Lens 120 collimates optical beam 142. As a chief ray, chief-ray 342 propagates through lens 120 without refraction, such that propagation angle $\theta_{mp}$ is the same on each side of lens 120. At fiber end-face plane 318, fiber optical axis 318A is located at a distance 313 from optical axis 322, where distance 313 equals $d_{325} \tan(\theta_{343})$. In embodiments, distance 313 equals $f_{eff} \tan(\theta_{343})$ where $f_{eff}$ is effective focal length 324 of lens 120. Herein, distance 313 is also denoted by $y_{313}$, as in equation (1).

$$y_{313} = f_{eff} \tan(\theta_{334}) \tag{1}$$

Chief-ray 342 is incident on diffraction grating 130 at an incident angle 143, herein also $\alpha_{in}$, with respect to a surface-normal of blazed diffractive surface 332. Incident angle 143 can be expressed in terms of grating tilt angle 334 and chief-ray angle 343, as in equation (2).

$$\alpha_{in} = \theta_{tilt} + \theta_{334} \tag{2}$$

Substituting $\theta_{334}$ from equation (1) into equation (2) yields a second expression for incident angle 143, as shown in equation (3).

$$\alpha_{in} = \theta_{tilt} + \arctan(y_{313}/f_{eff}) \tag{3}$$

Diffraction grating 130 generates, from optical beam 142 collimated by lens 120, diffracted beams 146(k), which have respective center-wavelengths 183(k) and diffracted orders $m_k$. In embodiments, while center wavelengths increase with increasing index k, diffracted orders $m_k$ remain constant or decrease with increasing k to facilitate configuration of diffraction grating 130 to operate in a near-Littrow configuration for multiple center-wavelengths 183. To this end, in embodiments, at least one of (i) each diffracted order $m_k$ is greater than one and (ii) grating period 336 of diffraction grating 130 is greater than four times the maximum of center-wavelengths 183.

Diffraction grating 130 operates in a Littrow configuration at center-wavelength 183(k) when blaze angle 333 of diffraction grating 130 equals $\arctan(m_1 \lambda_k/(2\Lambda))$, where $\Lambda$ is grating period 336. Denoting the minimum and maximum wavelengths of center-wavelengths 183 as $\lambda_{min}$ and $\lambda_{max}$ respectively, the corresponding minimum and maximum blaze angles are $\phi_{Bmin} = \arctan(m_1 \lambda_{min}/(2\Lambda))$ and $\theta_{Bmax} = \arctan(m_1 \lambda_{max}/(2\Lambda))$ respectively. In embodiments, blaze angle 333 differs from both angles $\phi_{min}$ and $\phi_{max}$ by less than five degrees such that diffraction grating 130 operates in a near-Littrow configuration for all center-wavelengths 183.

Each diffracted beam 146(k) propagates back toward optical-fiber array 110 at a respective diffracted angle 147(k), herein also denoted as $\beta_k$, with respect to a surface-normal of diffraction grating 130. FIG. 3 illustrates diffracted beams 146(1) and 146(2), which have respective diffracted orders $m_1$ and $m_2$ and diffracted angles 147(1) and 147(2), also denoted herein as $\beta_1$ and $\beta_2$ respectively. Per the grating equation at near-Littrow configurations, diffracted angle $\beta_k$ is expressed by equation (4), where $n_{inc}$ is the refractive index of the incident medium adjacent to blazed diffractive surface 332. When the incident medium is air, the setting $n_{inc} = 1$ sufficient for many applications.

$$\beta_k = \arcsin\left(\frac{(\lambda_k/\Lambda)m_k}{n_{inc}} - \sin(\alpha_{in})\right) \tag{4}$$

Diffracted angle $\beta_k$ hence depends on both center-wavelength $\lambda_k$ and diffraction order $m_k$. Substituting the right side of equation (3) for $\alpha_{in}$ yields equation (5).

$$\beta_k = \arcsin\left(\frac{(\lambda_k/\Lambda)m_k}{n_{inc}} - \sin\left[\theta_{tilt} + \arctan(y_{313}/f_{eff})\right]\right) \tag{5}$$

With respect to optical axis 322, diffracted beams 146(1) and 146(2) propagate at respective propagation angles 348(1) and 348(2), where are also denoted herein as $\theta_{out1}$ and $\theta_{out2}$. Angles $\theta_{out1}$ and $\theta_{out2}$ equal $(\beta_1 - \theta_{axis})$ and $(\beta_2 - \theta_{axis})$, respectively. More generally, for diffracted beam k of diffracted beams 1-N angle $\theta_{outk}$ equals $(\beta_k - \theta_{axis})$ For clarity of illustration, FIG. 3 represents diffracted beams 146(1, 2) as respective chief-rays 346(1, 2) of diffracted beams 146(1, 2). As a chief ray, chief-rays 346 propagate through lens 120 without refraction, such that lens 320 does not change the value of propagation angles 348 of chief-rays 346.

At fiber end-face plane 318 and with respect to optical axis 322, each fiber axis 316A(k) is located at a respective fiber-axis height 314(k) along the y axis. Similarly, each diffracted beam 146(k) intersects fiber end-face plane 318 at a respective beam-height 349(k), herein also $y_k$. Height $y_k$ equals $d_{325} \tan(\theta_{outk})$, or equivalently, $y_k$ equals $d_{325} \tan(\beta_k - \theta_{axis})$. In embodiments Height $y_k$ satisfies equation (6), where $f_{eff}$ is effective focal length 324 of lens 120 and $\beta_k$ is known from each of equations (4) and (5).

$$y_k = f_{eff} \tan(\beta_k - \theta_{axis}) \tag{6}$$

In embodiments of both of demultiplexing coupler 100 and method 200 (e.g., in step 220), each fiber-axis height 314(k) is substantially equal to beam-height 349(k) such that lens 120 couples diffracted beam 146(k) into output optical fiber 116(k). In embodiments, fiber-axis height 314(k) and beam-height 349(k) are substantially equal when fiber-axis height 314(k) and beam-height 349(k) differ by less the one-half the core diameter of output optical fiber 116(k).

Figure 4:
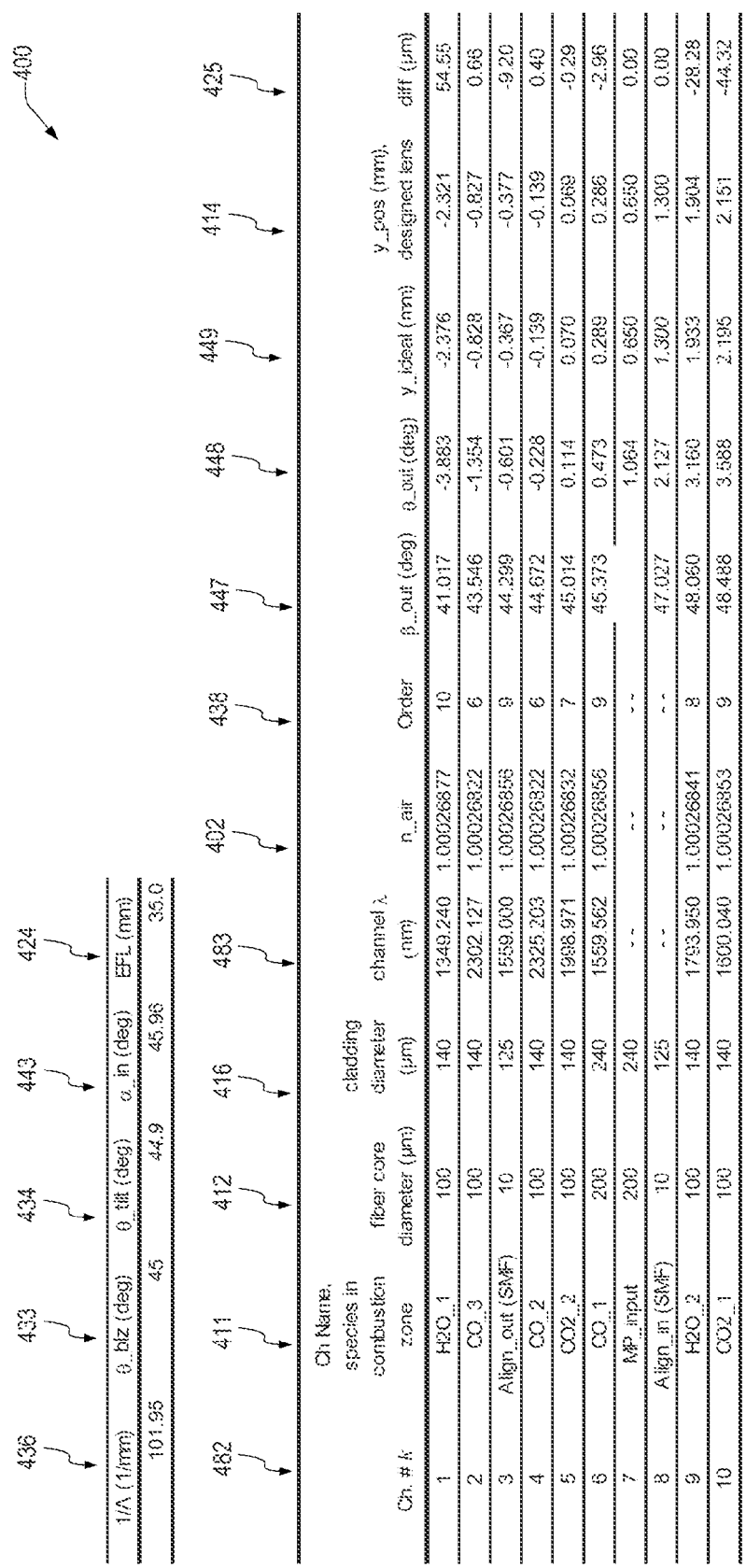
FIG. 4 illustrates part of a spreadsheet used to design an embodiment of demultiplexing filter of FIG. 1, in an embodiment.

FIG. 4 illustrates part of a spreadsheet 400 used to design an embodiment of demultiplexing filter 100. Spreadsheet 400 includes blaze angle 433, tilt angle 434, incident angle 443, and effective focal length 424, which are respective examples of blaze angle 333, tilt angle 334, incident angle 143, and effective focal length 324. Spreadsheet 400 also includes grating frequency 436, which is the multiplicative inverse of grating period 336.

Spreadsheet 400 also includes channel numbers 482, where channel number k is an integer in the range of one to ten; channel numbers 3 and 8 are alignment channels. Channel numbers 482 enumerate rows of spreadsheet 400 that include includes parameters of each channel such as channel name 411, fiber core diameter 412, fiber cladding 416, channel center-wavelength 483, refractive index 402, diffraction order 438, diffracted angle 447, propagation angle 448, ideal diffracted beam height 449, computed diffracted beam height 414, and height difference 425. For example, channel center-wavelength 483(k) is the center wavelength of channel k.

Each channel name 411 denotes a gas-phase species that has an absorption line at its respective channel center-wavelength 483, which is an example of center-wavelength 183. Each fiber core diameter 412(k) is the diameter of output optical fiber 116(k). Refractive index 402(k) is the refractive index of air at channel center-wavelength 483(k). Diffraction order 438(k) is the diffraction order $m_k$ of diffracted beam 146(k) that has channel center-wavelength 483(k). Diffracted angle 447(k) is an example of diffracted angle 147(k) and is computed from equation (5). Each propagation angle 448(k) is an example of propagation angle 148(k) and equals tilt angle 434 subtracted from diffracted angle 447(k).

Except for channel 7 (k=7), each ideal diffracted beam height 449(k) is computed from equation (6) and is an example of beam height 349(k). Beam height 449(7) corresponds to distance 313 of input optical fiber 112 (from optical axis 322), and is an initial input to spreadsheet 400 that is used to compute incident angle 443 per equation (2).

Incident angle 443 is the sum of propagation angle 448(7) and tilt angle 434. Propagation angle 448(7) is tilt angle 334 computed per equation (1), where $y_{313}$ is beam height 449(7) and $f_{eff}$ is effective focal length 424.

Figures 5, 6:
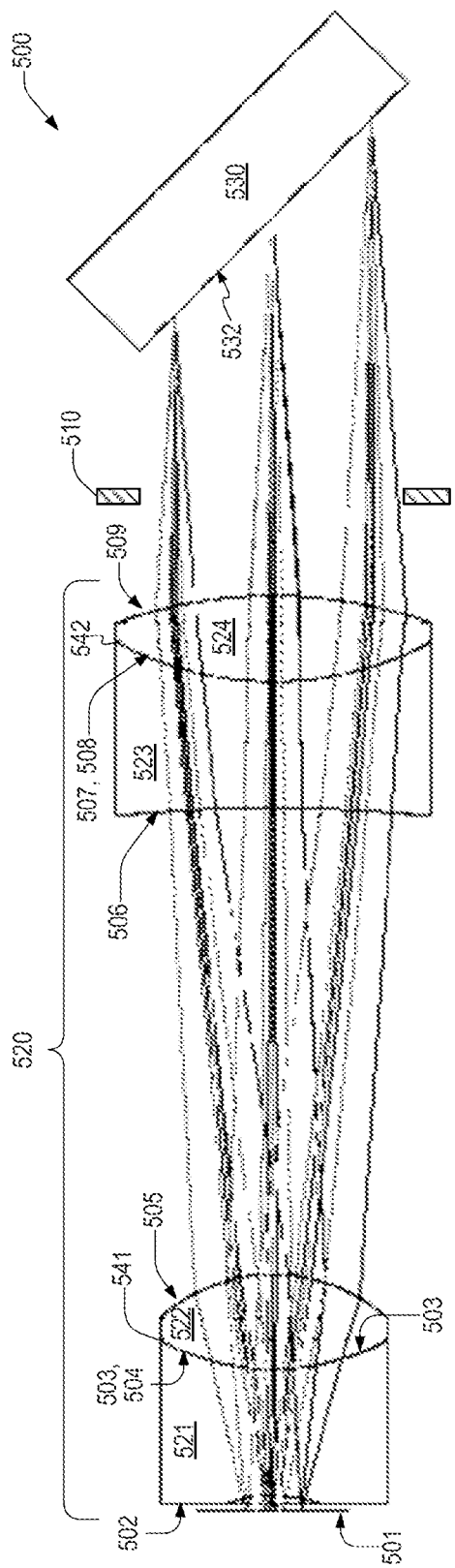
FIG. 5 is a schematic cross-sectional view of a demultiplexing filter that includes a lens designed to satisfy fiber positions of the spreadsheet of FIG. 4, in an embodiment.
FIG. 6 is a table of exemplary features of the lens of the demultiplexing filter of FIG. 5, in an embodiment.

Computed diffracted beam heights 414 result from designing a lens 520 that is optimized to have effective focal length 424 and beam heights corresponding to ideal diffracted beam heights 449. FIG. 5 is a schematic cross-sectional view of a demultiplexing filter 500 with a plurality of optical rays traced therethrough as computed by a commercially available optical design software. Filter 500 is an embodiment of filter 100, FIG. 1. Demultiplexing filter 500 includes lens 520 and diffraction grating 530, which of which is based on the parameters of spreadsheet 400. Diffraction grating 530 has a blazed diffracting surface 532, which is an example of blazed diffractive surface 332. Lens 520 and diffraction grating 530 are respective examples of lens 120 and diffraction grating 130. FIG. 6 is a table 600 of exemplary features of lens 520. FIGS. 5 and 6 are best viewed together in the following description.

Lens 520 includes lenses 521, 522, 523, and 524. Lens 520 also includes a coating 541 between lenses 521 and 522, and a coating 542 between lenses 523 and 524. Lenses 521-524 have respective front-surfaces 502, 504, 506, and 508 and respective back surfaces 503, 505, 507, and 509. In embodiments, demultiplexing filter 500 includes a baffle 510 between lens 524 and diffraction grating 530 for blocking stray light. Table 600 includes a row for each of the aforementioned surfaces and columns denoting the radius of curvature, thickness, and material associated with each surface.

A thickness value in a row denoting a specific surface indicates the on-axis distance between that specific surface and the next surface. For example, on the optical axis of lens 520, surfaces 502 and 503 are separated by 10.00 mm, which is the on-axis thickness of lens 521. Similarly, surfaces 504 and 505 are separated by 7.5 mm which is the on-axis thickness of lens 522. Table 600 indicates the minimum diameter of each surface sufficient for a ray emitted from input optical fiber 112 to pass through that surface.

Table 600 also indicates the materials of each of lenses 521-524 and coatings 541 and 542. Lenses 521 and 523 are formed of a niobophosphate high-refractive-index glass, such as glass S-NPH1 by Ohara GmbH. Each of coatings 541 and 542 is formed of a barium low-index glass, such as glass S-BAL41 by Ohara GmbH. Each of lenses 522 and 523 is formed of a dense flint glass, such as glass N-SF4 by Schott AG.

Figure 7:
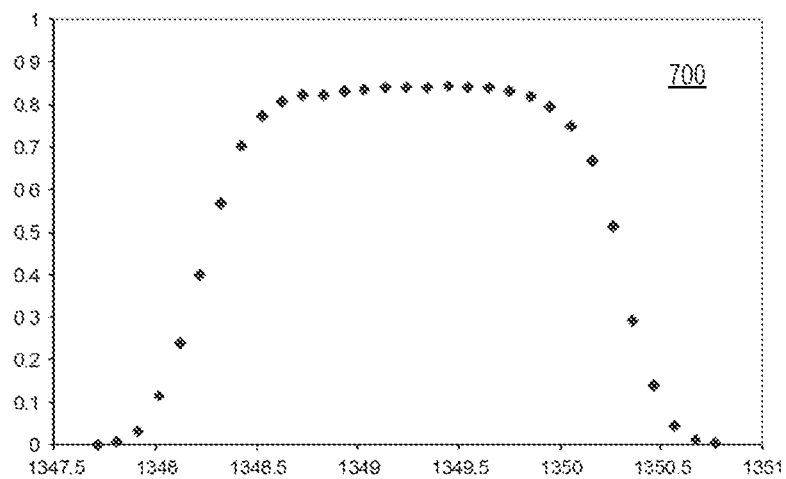
FIGS. 7, 8, and 9 are respective optical spectra of diffracted beams coupled into respective output optical fibers in the embodiment of demultiplexing filter of FIG. 4.
Figure 8:
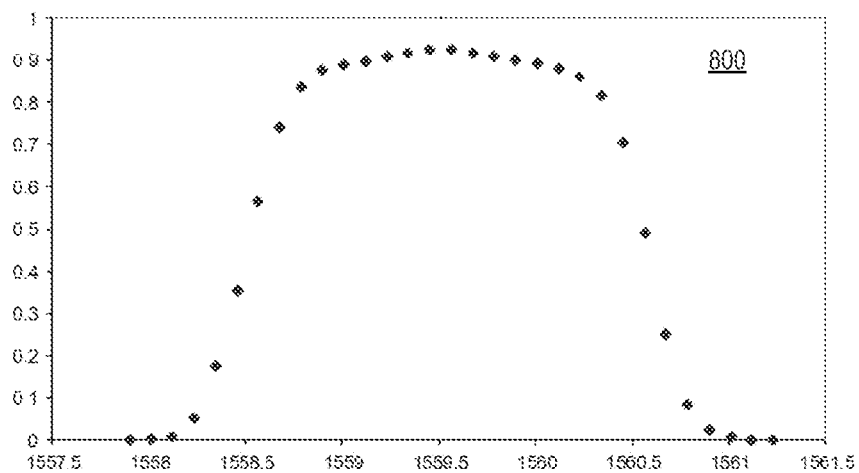
Figure 9:
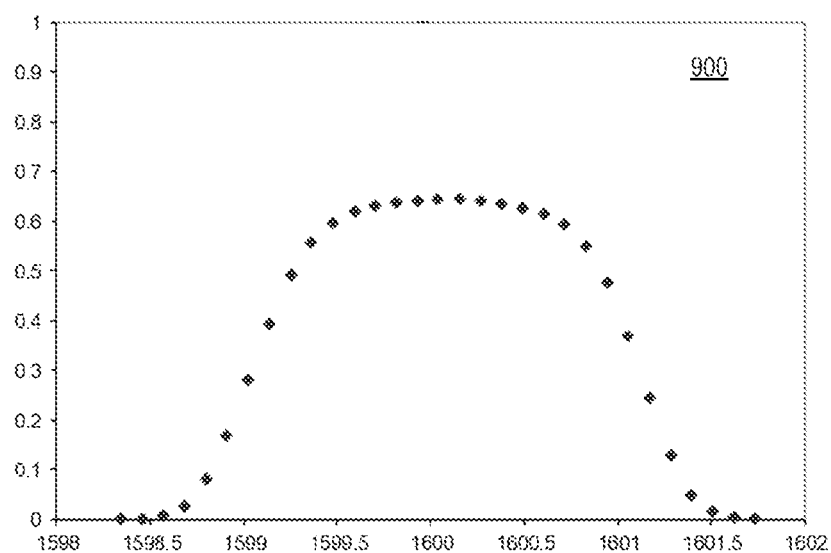

FIGS. 7, 8, and 9 are respective optical spectra 700, 800, and 900 of diffracted beams 146 coupled into respective output optical fibers 116 in the embodiment of demultiplexing filter 100 described in FIG. 4. The center wavelengths of each optical spectrum 700, 800, and 900 corresponds to respective center wavelengths of channels 1, 6, and 10 of table 400, FIG. 4.

The narrow spectral width of each optical spectrum 700-900—approximately two nanometers—is indicative of the high reciprocal linear dispersion (plate factor) of demultiplexing filter 100, which in part results from a ratio of grating period 336 to the longest center wavelengths 183 being large, (more than four times, for example). In embodiments, the reciprocal linear dispersion of demultiplexing filter 100 is approximately one nanometer per one hundred micrometers for all channels.

Combinations of Features (A1) A demultiplexed filtering method includes propagating an optical beam from an input optical fiber to a diffraction grating to produce a first diffracted beam and a second diffracted beam. A center-wavelength of the first diffracted beam equals a first center-wavelength of a first channel of the optical beam. A center-wavelength of the second diffracted beam equals a second center-wavelength of a second channel of the optical beam. The second center-wavelength exceeds the first center-wavelength. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$. The method also includes (i) coupling the first diffracted beam into a first optical fiber of a one-dimensional optical-fiber array that includes the input optical fiber, and (ii) coupling the second diffracted beam into a second optical fiber of the one-dimensional optical-fiber array.

(A2) Method (A1) may further include collimating the optical beam with a lens located between a tip of the input optical fiber and the diffraction grating; wherein said coupling includes focusing first diffracted beam and the second diffracted beam with the lens.

(A3) Either of methods (A1) and (A2), may further include coupling the third diffracted beam into a third optical fiber of the one-dimensional optical-fiber array, wherein said propagating the optical beam to the grating also produces the third diffracted beam, a center wavelength thereof equaling the third center wavelength of a third channel of the optical beam and exceeding the second center wavelength, that propagates back toward the input optical fiber at a third diffracted angle determined in part by the third center-wavelength and a diffraction order $m_3$ of the third diffracted beam that is less than the diffraction order $m_2$.

(A4) Any one of methods (A1)-(A3) may further include collimating the optical beam with a lens located between a tip of the input optical fiber and the diffraction grating; a distance between the first optical fiber and an optical axis of the lens being equal to $f_{eff} \cdot \tan(\beta_{out1} - \theta_{axis})$; where $f_{eff}$ is an effective focal length of the lens, $\beta_{out1}$ is an angle between the first diffracted beam and a surface-normal of the diffraction grating, and $\theta_{axis}$ is an angle between the surface-normal and the optical axis in a plane that includes the one-dimensional optical-fiber array, and $\beta_{out1} = \arcsin(m_1 \lambda_1 / \Lambda - \sin[\theta_{axis} + \arctan(y_{mp}/f_{eff})])$, where $\lambda_1$ is the first center wavelength, $\Lambda$ is a period of the diffraction grating, and $y_{mp}$ is the distance between the input optical fiber and the optical axis; and a distance between the second optical fiber and an optical axis of the lens being equal to $f_{eff} \cdot \tan(\beta_{out2} - \theta_{axis})$; $\beta_{out2}$ is an angle between the first diffracted beam and a surface-normal of the diffraction grating, and $\beta_{out2} = \arcsin(m_2 \lambda_2 / \Lambda - \sin[\theta_{axis} + \arctan(y_{mp}/f_{eff})])$, where $\lambda_2$ is the second center-wavelength.

(A5) In any of methods (A1)-(A4), diffraction order $m_2$ may be greater than one.

(A6) In any of methods (A1)-(A5), may further include (i) propagating a multiplexed probe beam through a combustion zone, the optical beam being the multiplexed probe beam after transmission through the combustion zone; and (ii) coupling the optical beam into the input optical fiber.

(B1) A method for measuring species concentration in a combustion zone includes propagating a multiplexed input probe beam through the combustion zone to produce an output probe beam and coupling the output probe beam into an input optical fiber. The combustion zone includes (i) a first gas-phase species that has an absorption line at a first center-wavelength and (ii) a second gas-phase species that has an absorption line at a second center-wavelength that exceeds the first center-wavelength. The method also includes propagating the output probe beam from the input optical fiber to a diffraction grating to produce a first diffracted beam and a second diffracted beam. A center-wavelength of the first diffracted beam equals the first center-wavelength. A center-wavelength of the second diffracted beam equals the second center-wavelength. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$. The method also includes (i) coupling the first diffracted beam into a first optical fiber of a one-dimensional optical-fiber array that includes the input optical fiber, and (ii) coupling the second diffracted beam into a second optical fiber of the one-dimensional optical-fiber array. The method also includes measuring (i) a first signal amplitude of the first diffracted beam output from the first optical fiber and (ii) a second signal amplitude of the second diffracted beam output from the second optical fiber. The method also includes determining (i) from the first signal amplitude, a concentration of the first gas-phase species and the second gas-phase species.

(C1) A demultiplexing filter includes an optical-fiber array, a diffraction grating, and a lens. The optical-fiber array includes (i) an input optical fiber having a fiber optical axis and an input fiber end-face, a surface thereof defining a fiber end-face plane; (ii) a first output optical fiber having a first fiber end-face that is substantially coplanar to the fiber end-face plane, and a first optical axis that is parallel to and coplanar with the fiber optical axis; and (iii) a second output optical fiber having a second fiber end-face that is coplanar to the fiber end-face plane to within the tolerance, and a second optical axis that is parallel to and coplanar with the fiber optical axis, the input fiber end-face, the first fiber end-face, and the second fiber end-face being collinear. The diffraction grating has a blazed diffractive surface facing the fiber end-face plane and tilted, with respect to the fiber optical axis, by a tilt angle that deviates from a blaze angle of the blazed diffractive surface by between 0.05 and 0.5 degrees. The lens is located along an optical path between the optical-fiber array and the diffraction grating, having a lens optical-axis perpendicular to the fiber end-face plane and configured to form an image of the blazed diffractive surface in a focal plane that is substantially coplanar with the fiber end-face plane.

(C2) In demultiplexing filter (C1), a distance between the fiber end-face plane and a principal plane of the lens may substantially equal to an effective focal length of the lens.

(C3) In either one of demultiplexing filters (C1) and (C2), at least one of the input optical fiber, the first output optical fiber, and the second output optical fiber may operate as a multi-mode fiber in a wavelength range between 1.3 micrometers and 2.5 micrometers.

(C4) In any of demultiplexing filters (C1)-(C3), the input optical fiber emits an optical beam including a first optical channel having a first center-wavelength and a second optical channel having a second center-wavelength exceeding the first center-wavelength. The lens collimates the optical beam. The diffraction grating generates, from the collimated optical beam, a first diffracted beam and a second diffracted beam. A center-wavelength of the first diffracted beam equals a first center-wavelength of a first channel of the optical beam. A center-wavelength of the second diffracted beam equals a second center-wavelength of a second channel of the optical beam. The second center-wavelength exceeds the first center-wavelength. The first diffracted beam propagates back toward the input optical fiber at a first diffracted angle determined in part by the first center-wavelength and a diffraction order $m_1$ of the first diffracted beam. The second diffracted beam propagates back toward the input optical fiber at a second diffracted angle determined in part by the second center-wavelength and a diffraction order $m_2$ of the second diffracted beam that is less than the diffraction order $m_1$.

(C5) In any demultiplexing filter (C4), each of the first center-wavelength and the second center-wavelength may be between 1.3 micrometers and 2.5 micrometers.

(C6) In either one of demultiplexing filters (C4) and (C5), at least one of the first center-wavelength and the second center-wavelength corresponding to an absorption line of one of carbon monoxide, water, and carbon dioxide.

(C7) In any one of demultiplexing filters (C4)-(C6), the input optical fiber may have a core radius $a_0$ and a numerical aperture $NA_0$ such that a parameter $2\pi(a_0/\lambda_2)NA_0$ is greater than or equal to 2.405 to ensure multi-mode operation at both the first center-wavelength and the second center-wavelength, denoted by $\lambda_2$; the first output optical fiber r may have a core radius $a_1$ and a numerical aperture $NA_1$ such that a parameter $2\pi(a_1/\lambda_1)NA_1$ is greater than or equal to 2.405 to ensure multi-mode operation at the first center-wavelength, denoted by $\lambda_1$; and the second optical fiber may have a core radius $a_2$ and a numerical aperture $NA_2$ such that a parameter $2\pi(a_2/\lambda_2)NA_2$ is greater than or equal to 2.405 to ensure multi-mode operation at the second center-wavelength.

(C8) In any one of demultiplexing filters (C4)-(C7), diffraction order $m_2$ may be greater than one.

(C9) In any one of demultiplexing filters (C4)-(C8), the diffraction grating may have a grating period greater than four times the second center-wavelength.

(C10) Any one of demultiplexing filters (C4)-(C9) may further include a plurality of lasers optically coupled to the input optical fiber, to generate the optical beam.

(C11) In embodiments of any one of demultiplexing filters (C4)-(C10), the emitted optical beam includes a third optical channel having a third center-wavelength that exceeds the second center-wavelength; the optical-fiber array includes a third output optical fiber having a third fiber end-face that is coplanar to the fiber end-face plane to within the tolerance and collinear with the first and second fiber end-faces, and a third optical axis that is parallel to and coplanar with the input-fiber optical axis; and wherein the diffraction grating generates, from the collimated optical beam, a third diffracted beam, a center-wavelength thereof equal to the third center-wavelength, that propagates back toward the optical-fiber array at a third diffracted angle determined in part by the third center-wavelength and a diffraction order $m_3$ of the third diffracted beam that is less than the diffraction order $m_2$.

(C12) In embodiments of any one of demultiplexing filters (C4)-(C11), the diffraction grating has a period $\Lambda$, an ideal grating blaze-angle for Littrow-configuration operation at the first center-wavelength and the second center-wavelength being $\phi_1 = \arctan(m_1\lambda_1/(2\Lambda))$ and $\phi_2 = \arctan(m_2\lambda_2/$ (2Λ)) respectively, where $\lambda_1$ and $\lambda_2$ denote the first and second center wavelengths respectively, the diffraction grating having a grating blaze-angle $\theta_B$ that differs from each of grating blaze-angles $\phi_1$ and $\phi_2$ by less than five degrees.

(C13) In embodiments of any one of demultiplexing filters (C4)-(C12), a distance between the first output optical fiber and the lens optical-axis is equal to $f_{eff} \cdot \tan(\beta_{out1} - \theta_{axis})$; where $f_{eff}$ is an effective focal length of the lens, where $\beta_{out1}$ is the first diffraction angle, and $\theta_{axis}$ is an angle between the surface-normal and the lens optical-axis in a plane that includes the optical-fiber array; and a distance between the second output optical fiber and the lens optical-axis of the lens is equal to $f_{eff} \cdot \tan(\beta_{out2} - \theta_{axis})$, where $\beta_{out2}$ is the second diffraction angle.

(C14) In embodiments of demultiplexing filter (C13), the first diffracted angle $\beta_{out1}$ equals arcsin $(m_1\lambda_1/\Lambda - \sin[\theta_{axis} + \arctan(y_{mp}/f_{eff})])$, where $\lambda_1$ is the first center wavelength, $\Lambda$ is a period of the diffraction grating, and $y_{mp}$ is the distance between the input optical fiber and the lens optical axis; and the second diffraction angle $\beta_{out2}$ equals arcsin$(m_2\lambda_2/\Lambda - \sin[\theta_{axis} + \arctan(y_{mp}/f_{eff})])$, where $\lambda_2$ is the second center-wavelength.

(C15) In embodiments of either demultiplexing filter (C13) or (C14), the emitted optical beam includes a third optical channel has a third center-wavelength that exceeds the second center-wavelength; the optical-fiber array includes a third output optical fiber has a third fiber end-face that is coplanar to the fiber end-face plane to within the tolerance and collinear with the first and second fiber end-faces, and a third optical axis that is parallel to and coplanar with the input-fiber optical axis; the diffraction grating configured to generate, from the collimated optical beam, a third diffracted beam, a center-wavelength thereof equal to the third center-wavelength, that propagates back toward the optical-fiber array at a third diffracted angle determined in part by the third center-wavelength and a diffraction order $m_3$ of the third diffracted beam that is less than the diffraction order $m_2$; and a distance between the third output optical fiber and the lens optical-axis of the lens is equal to $f_{eff} \cdot \tan(\beta_{out3} - \theta_{axis})$, where $\beta_{out3}$ is the third diffraction angle.

(C16) In embodiments of demultiplexing filter (C15), the third diffraction angle $\beta_{out3}$ equals arcsin$(m_3\lambda_3/\Lambda - \sin[\theta_{axis} + \arctan(y_{mp}/f_{eff})])$, where $\lambda_3$ is the third center-wavelength.

(C17) In embodiments of any of demultiplexing filters (C1)-(C15) at least one of the input optical fiber, the first output optical fiber, and the second output optical fiber has a fiber core diameter than exceeds fifty micrometers.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A demultiplexed filtering method, comprising:
   propagating an optical beam from an input optical fiber through a lens to a diffraction grating to produce:
   (i) a first diffracted beam, a center-wavelength thereof equaling a first center-wavelength of a first channel of the optical beam, that propagates back toward the input optical fiber at a first diffracted angle determined in part by the first center-wavelength and a diffraction order $m_1$ of the first diffracted beam; and
   (ii) a second diffracted beam, a center-wavelength thereof equaling a second center-wavelength of a second channel of the optical beam and exceeding the first center wavelength, that propagates back toward the input optical fiber at a second diffracted angle determined in part by the second center-wavelength and a diffraction order $m_2$ of the second diffracted beam that is less than the diffraction order $m_1$;
   wherein the lens has a ray propagated therethrough without refraction, such that a propagation angle of the ray is the same on each side of lens;
   coupling the first diffracted beam into a first optical fiber of a one-dimensional optical-fiber array that includes the input optical fiber; and
   coupling the second diffracted beam into a second optical fiber of the one-dimensional optical-fiber array.

2. The method of claim 1, further comprising:
   collimating the optical beam with the lens located between a tip of the input optical fiber and the diffraction grating; and
   said coupling comprising focusing first diffracted beam and the second diffracted beam with the lens.

3. The method of claim 1, further comprising coupling the third diffracted beam into a third optical fiber of the one-dimensional optical-fiber array, wherein said propagating the optical beam to the grating also produces the third diffracted beam, a center wavelength thereof equaling the third center wavelength of a third channel of the optical beam and exceeding the second center wavelength, that propagates back toward the input optical fiber at a third diffracted angle determined in part by the third center-wavelength and a diffraction order $m_3$ of the third diffracted beam that is less than the diffraction order $m_2$.

4. The method of claim 1, further comprising
   collimating the optical beam with the lens located between a tip of the input optical fiber and the diffraction grating;
   a distance between the first optical fiber and an optical axis of the lens being equal to $f_{eff} \cdot \tan(\beta_{out1} - \theta_{axis})$; where $f_{eff}$ is an effective focal length of the lens, $\beta_{out1}$ is an angle between the first diffracted beam and a surface-normal of the diffraction grating, and $\theta_{axis}$ is an angle between the surface-normal and the optical axis in a plane that includes the one-dimensional optical-fiber array, and $\beta_{out1} = \arcsin(m_1\lambda_1/\Lambda - \sin[\theta_{axis} + \arctan(y_{mp}/f_{eff})])$, where $\lambda_1$ is the first center wavelength, $\Lambda$ is a period of the diffraction grating, and $y_{mp}$ is the distance between the input optical fiber and the optical axis; and
   a distance between the second optical fiber and an optical axis of the lens being equal to $f_{eff} \cdot \tan(\beta_{out2} - \theta_{axis})$; $\beta_{out2}$ is an angle between the first diffracted beam and a surface-normal of the diffraction grating, and $\beta_{out2} = \arcsin(m_2\lambda_2/\Lambda - \sin[\theta_{axis} + \arctan(y_{mp}/f_{eff})])$, where $\lambda_2$ is the second center-wavelength.

5. The method of claim 4, diffraction order $m_2$ being greater than one.

6. The method of claim 1, further comprising:
propagating a multiplexed probe beam through a combustion zone, the optical beam being the multiplexed probe beam after transmission through the combustion zone; and
coupling the optical beam into the input optical fiber.

7. A demultiplexing filter, comprising:
an optical-fiber array comprising an input optical fiber having a fiber optical axis and an input fiber end-face, a surface thereof defining a fiber end-face plane;
a first output optical fiber having a first fiber end-face that is substantially coplanar to the fiber end-face plane, and a first optical axis that is parallel to and coplanar with the fiber optical axis; and
a second output optical fiber having a second fiber end-face that is coplanar to the fiber end-face plane to within a predetermined tolerance, and a second optical axis that is parallel to and coplanar with the fiber optical axis, the input fiber end-face, the first fiber end-face, and the second fiber end-face being collinear;
a diffraction grating having a blazed diffractive surface facing the fiber end-face plane and tilted, with respect to the fiber optical axis, by a tilt angle that deviates from a blaze angle of the blazed diffractive surface by between 0.05 and 0.5 degrees; and
a lens along an optical path between the optical-fiber array and the diffraction grating, having a lens optical-axis perpendicular to the fiber end-face plane and configured to propagate a ray therethrough without refraction, such that a propagation angle of the ray is the same on each side of lens, and the lens further configured to form an image of the blazed diffractive surface in a focal plane that is substantially coplanar with the fiber end-face plane.

8. The demultiplexing filter of claim 7, a distance between the fiber end-face plane and a principal plane of the lens being substantially equal to an effective focal length of the lens.

9. The demultiplexing filter of claim 7, at least one of the input optical fiber, the first output optical fiber and the second output optical fiber operating as a multi-mode fiber in a wavelength range between 1.3 micrometers and 2.5 micrometers.

10. The demultiplexing filter of claim 7, at least one of the input optical fiber, the first output optical fiber, and the second output optical fiber having a fiber core diameter than exceeds fifty micrometers.

11. The demultiplexing filter of claim 7, wherein:
the input optical fiber emits an optical beam including a first optical channel having a first center-wavelength and a second optical channel having a second center-wavelength exceeding the first center-wavelength;
the lens collimates the optical beam; and
the diffraction grating generates, from the collimated optical beam, (i) a first diffracted beam, a center-wavelength thereof equal to the first center-wavelength, that propagates back toward the optical-fiber array at a first diffracted angle between the first diffracted beam and a surface-normal of the diffraction grating determined by the first center-wavelength and a diffraction order $m_1$ of the first diffracted beam, and (ii) a second diffracted beam, a center-wavelength thereof equal to the second center-wavelength, that propagates back toward the optical-fiber array at a second diffracted angle between the second diffracted beam and the surface-normal determined by the second center-wavelength and a diffraction order $m_2$ of the second diffracted beam that is less than the diffraction order $m_1$.

12. The demultiplexing filter of claim 11, each of the first center-wavelength and the second center-wavelength being between 1.3 micrometers and 2.5 micrometers.

13. The demultiplexing filter of claim 11, at least one of the first center-wavelength and the second center-wavelength corresponding to an absorption line of one of carbon monoxide, water, and carbon dioxide.

14. The demultiplexing filter of claim 11,
the input optical fiber having a core radius $a_0$ and a numerical aperture $NA_0$ such that a parameter $2\pi(a_0/\lambda_2)NA_0$ is greater than or equal to 2.405 to ensure multi-mode operation at both the first center-wavelength and the second center-wavelength, denoted by $\lambda_2$;
the first output optical fiber having a core radius $a_1$ and a numerical aperture $NA_1$ such that a parameter $2\pi(a_1/\lambda_1)NA_1$ is greater than or equal to 2.405 to ensure multi-mode operation at the first center-wavelength, denoted by $\lambda_1$;
the second optical fiber having a core radius $a_2$ and a numerical aperture $NA_2$ such that a parameter $2\pi(a_2/\lambda_2)NA_2$ is greater than or equal to 2.405 to ensure multi-mode operation at the second center-wavelength.

15. The demultiplexing filter of claim 11, diffraction order $m_2$ being greater than one.

16. The demultiplexing filter of claim 11, the diffraction grating having a grating period greater than four times the second center-wavelength.

17. The demultiplexing filter of claim 11, further comprising a plurality of lasers optically coupled to the input optical fiber, to generate the optical beam.

18. The demultiplexing filter of claim 11,
the emitted optical beam including a third optical channel having a third center-wavelength that exceeds the second center-wavelength;
the optical-fiber array including a third output optical fiber having a third fiber end-face that is coplanar to the fiber end-face plane to within the predetermined tolerance and collinear with the first and second fiber end-faces, and a third optical axis that is parallel to and coplanar with an input-fiber optical axis; and
wherein the diffraction grating generates, from the collimated optical beam, a third diffracted beam, a center-wavelength thereof equal to the third center-wavelength, that propagates back toward the optical-fiber array at a third diffracted angle determined in part by the third center-wavelength and a diffraction order $m_3$ of the third diffracted beam that is less than the diffraction order $m_2$.

19. The demultiplexing filter of claim 11, the diffraction grating having a period $\Lambda$, an ideal grating blaze-angle for Littrow-configuration operation at the first center-wavelength and the second center-wavelength being $\phi_1$=arctan$(m_1\lambda_1/(2\Lambda))$ and $\phi_2$=arctan$(m_2\lambda_2/(2\Lambda))$ respectively, where $\lambda_1$ and $\lambda_2$ denote the first and second center wavelengths respectively, the diffraction grating having a grating blaze-angle $\theta_B$ that differs from each of grating blaze-angles $\phi_1$ and $\phi_2$ by less than five degrees.

20. The demultiplexing filter of claim 11,
a distance between the first output optical fiber and the lens optical-axis being equal to $f_{eff}\cdot\tan(\beta_{out1}-\theta_{axis})$; where $f_{eff}$ is an effective focal length of the lens, where $\beta_{out1}$ is the first diffraction angle, and $\theta_{axis}$ is an angle between the surface-normal and the lens optical-axis in a plane that includes the optical-fiber array; and a distance between the second output optical fiber and the lens optical-axis of the lens being equal to $f_{eff} \cdot \tan(\beta_{out2} - \theta_{axis})$, where $\beta_{out2}$ is the second diffraction angle.

21. The demultiplexing filter of claim 20,
the first diffracted angle $\beta_{out1}$ equaling $\arcsin(m_1\lambda_1/\Lambda - \sin[\theta_{axis} + \arctan(y_{mp}/f_{eff})])$, where $\lambda_1$ is the first center wavelength, $\Lambda$ is a period of the diffraction grating, and $y_{mp}$ is the distance between the input optical fiber and the lens optical axis; and
the second diffracted angle $\beta_{out2}$ equaling $\arcsin(m_2\lambda_2/\Lambda - \sin[\theta_{axis} + \arctan(y_{mp}/f_{eff})])$, where $\lambda_2$ is the second center-wavelength.

22. The demultiplexing filter of claim 20,
the emitted optical beam including a third optical channel having a third center-wavelength that exceeds the second center-wavelength;
the optical-fiber array including a third output optical fiber having a third fiber end-face that is coplanar to the fiber end-face plane to within the predetermined tolerance and collinear with the first and second fiber end-faces, and a third optical axis that is parallel to and coplanar with an input-fiber optical axis;
the diffraction grating configured to generate, from the collimated optical beam, a third diffracted beam, a center-wavelength thereof equal to the third center-wavelength, that propagates back toward the optical-fiber array at a third diffracted angle determined in part by the third center-wavelength and a diffraction order $m_3$ of the third diffracted beam that is less than the diffraction order $m_2$; and
a distance between the third output optical fiber and the lens optical-axis of the lens being equal to $f_{eff} \cdot \tan(\beta_{out3} - \theta_{axis})$, where $\beta_{out3}$ is the third diffraction angle.

23. The demultiplexing filter of claim 22, the third diffraction angle $\beta_{out3}$ equaling $\arcsin(m_3\lambda_3/\Lambda - \sin[\theta_{axis} + \arctan(y_{mp}/f_{eff})])$, where $\lambda_3$ is the third center-wavelength.

24. A method for measuring species concentration in a combustion zone, comprising:

propagating a multiplexed input probe beam through a lens in the combustion zone to produce an output probe beam, the combustion zone including (i) a first gas-phase species that has an absorption line at a first center-wavelength and (ii) a second gas-phase species that has an absorption line at a second center wavelength that exceeds the first center-wavelength, the lens having a ray propagated therethrough without refraction, such that a propagation angle of the ray is the same on each side of lens;
coupling the output probe beam into an input optical fiber;
propagating the output probe beam from the input optical fiber to a diffraction grating to produce;
(i) a first diffracted beam, a center-wavelength thereof equaling the first center-wavelength, that propagates back toward the input optical fiber at a first diffracted angle determined in part by the first center-wavelength and a diffraction order $m_1$ of the first diffracted beam; and
(ii) a second diffracted beam, a center-wavelength thereof equaling the second center-wavelength, that propagates back toward the input optical fiber at a second diffracted angle determined in part by the second center-wavelength and a diffraction order $m_2$ of the second diffracted beam that is less than the diffraction order $m_1$;
coupling the first diffracted beam into a first optical fiber of a one-dimensional optical-fiber array that includes the input optical fiber;
coupling the second diffracted beam into a second optical fiber of the one-dimensional optical-fiber array;
measuring (i) a first signal amplitude of the first diffracted beam output from the first optical fiber and (ii) a second signal amplitude of the second diffracted beam output from the second optical fiber;
determining (i) from the first signal amplitude, a concentration of the first gas-phase species and the second gas-phase species.

* * * * *